Patented Feb. 12, 1946

2,394,910

UNITED STATES PATENT OFFICE 2,394,910

PREPARATION OF POLYDIOXOLANE

William F. Gresham, Wilmington, Del., assignor to E. I. du Pont de Nemours & Company, Wilmington, Del., a corporation of Delaware No Drawing. Application May 6, 1941,
Serial No. 392,124

4 Claims. (Cl. 260—2)

This invention relates to a process for the preparation of polymers of 1,3-dioxolane and to the polymeric products.

Heretofore, it was known that cyclic acetals having more than 5 and preferably more than 6 members were polymerizable, while those skilled in chemistry knowing the stability of the 5-member ring, were of the belief that it would not polymerize. The literature on the preparation of linear polymers has avoided by and large the five-member ring compounds apparently because the experimenters in the art, knowing the stability of this ring, were convinced they could not be polymerized. Attention accordingly was directed to the less stable compounds known to be polymerizable such as those having 6 or more atoms in the ring.

An object of the present invention is to provide new polymeric forms of matter and processes for their preparation. Another object is to provide new polymeric compositions from 1,3-dioxolane. Still another object is to provide a process for the polymerization of 1,3-dioxolane, its isomers and metamers. Another object of the invention is to provide mixtures or interpolymers of 1,3-dioxolane with its isomers, its metamers, substituted 1,3-dioxolanes and with the cyclic and alicyclic alkylene oxides. Yet another object is to provide polymers containing the repeating ethenoxymethenoxy group,

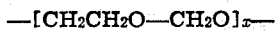

in which $x$ is more than 1. Other objects and advantages of the invention will hereinafter appear.

It has been found that 1,3-dioxolane can be polymerized to give polymers having a range of properties from liquids to solids by contacting it with a suitable catalyst under properly controlled conditions. The reaction possibly proceeds in accord with the equation

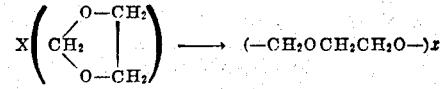

The polymeric product designates a repeating ethenoxymethenoxy group in which $x$ is greater than one although unsymmetrical and cross linkages may exist in the polymer produced. When $x$ is less than ten, the product is usually a mobile to viscous liquid, with $x$ greater than ten the products are generally solids, while with molecular weights in the order of 10,000 or more the polymers are tough, cold-drawable solids.

The polymerization is effected at temperatures ranging between —80° C. and +300° C. and preferably between 0 and 150° C. Atmospheric, sub- or superatmospheric pressures may be used and if the last, pressures may range between 1 and 100 atmospheres or higher. Normally, excellent results are obtained at or above atmospheric pressure. If desired, the temperature of the reaction, especially when polymerization is carried out at the boiling point of the cyclic compound, may be controlled by varying the pressure on the boiling reactants.

It has been found advantageous to effect the polymerization in the presence of a catalyst such, for example, as sulfuric acid, phosphoric acid, hydrochloric acid, hydrofluoric acid (alone or with $BF_3$), boron fluoride (including its complexes with water, acids, esters, alcohols, and the like), paratoluene sulfonic acid, camphor sulfonic acid and other acid catalysts of this general nature. Friedel-Crafts type catalysts other than $BF_3$ may be used such as $AlCl_3$, $AlBr_3$, $FeCl_3$, etc., as may be inorganic acids generally, and their acid salts such as sodium acid sulfate, sodium acid phosphate, etc.

The catalyst may be supported or not on inert supports such as charcoal, silica gel (which is alone a catalyst for the reaction), kieselguhr, etc. Concentrations of $BF_3$, $H_2SO_4$, and similarly strong acid catalysts may be extremely low, less than 0.1% and amounts down to as low as 0.001% of these strong acid catalysts have been found sufficient to give polymers although high concentrations of catalyst even equal to the weight of the 1,3-dioxolane were likewise found to be satisfactory.

The polymerization of 1,3-dioxolane may be carried out by a one-step or a multiple-step process. In the former the 1,3-dioxolane, together with a suitable polymerization catalyst, may be heated under a reflux condenser or may be allowed to stand at room temperature or below, until the desired molecular weight polymer forms. Polymerization occurs as has been indicated, over a wide range of temperatures and doubtless the polymerization starts as soon as a polymerization catalyst is added to the monomeric compound. If temperatures are employed above the boiling point of the cyclic acetal, a reflux condenser is employed, or, if desired, pressure may be substituted in order to prevent the loss of the monomer which otherwise would distill off during the early stages of the reaction.

In contradistinction to the one-step process, the process may be carried out in a plurality of stages. For example, in the first stage the 1,3- dioxolane can be heated, under reflux until boiling ceases, the catalyst neutralized and separated and the product, which under these conditions is polymerized to low molecular weight or mixtures of low molecular weight products (or maybe a monomer-polymer mixture), can be used in this form or at a subsequent time it can be subjected to further polymerization under similar or different polymerization conditions. This versatility of polymerization control can also be attained by carrying out the first stage under low temperature conditions and completing the polymerization at high temperatures or vice versa.

By the two-step process, it is possible to effect the final polymerization in a locus in which polymerization by the single-step polymerization process would be difficult if not impossible. For example, fabric may be impregnated with the incompletely polymerized mixture with or without catalyst and the fabric ironed to attain the final stages of polymerization in situ, or such a mixture may be inserted, after addition of the catalyst, in a mold or injected into a biological specimen or other enclosed space and polymerization completed therein.

The polymerization may be conducted in such a manner that the final products range in properties from liquids to solids. A short time and high rate of polymerization usually result in the more fluid liquids, while the more extended time and slow rate of polymerization usually result in the formation of highly viscous to wax-like solids and, under properly controlled conditions, tough cold-drawable solids.

Tough films can be prepared by dissolving the high molecular weight polymers in water to give a solution containing in the order of 15% polymer, flowing the solution on a suitable surface, and allowing the water to evaporate at atmospheric or reduced pressures. The film when stripped from the surface can be stretched to give the superior strength to the film resulting from cold drawing. Lower molecular weight polymers will give films of lower strength. Films can likewise be obtained by preparing a powder from the polymer by filing, grinding, or otherwise treating it and by thermoplastic molding forming the sheet which can be stretched as described.

The reaction mixture, after partial (by the first step of the two-step process) or complete polymerization, may be treated with an inorganic base (such as ammonia, alkali metal, and alkaline earth metal hydroxides, carbonates, alkoxides, etc.) or an organic base (such as pyridine, methyl amine, and dimethyl amine) to neutralize the catalyst (immediately upon neutralization it is believed that the polymerization reaction ceases) and the unconverted reactants may be removed by distillation under reduced pressure. The neutralized catalyst may be filtered off, remaining polymerized product recovered, purified if desired by solution in a suitable solvent, and clarified with kieselguhr or other similar material. In addition to being instrumental in stopping the reaction at the desired point the neutralization of the catalyst stabilizes the product. It follows, therefore, that for high temperature uses no acids should be present and the product should be neutral or on the alkaline side.

1,3-dioxolane may be polymerized in various ways. The polymerization may be carried out by treating the monomer and catalyst in the presence or absence of a solvent for the monomer and polymer and for this type of polymerization such solvents as 1,4-dioxane, benzene, toluene, etc. may be used. If desired, polymerization can be effected in a solvent for the monomer which is a non-solvent for the polymer; by this method the polymer will precipitate from solution as formed. For polymerization in this manner, 1,3-dioxolane can be polymerized in cyclohexane which is a solvent for the monomeric but not for the polymeric 1,3-dioxolane.

1,3-dioxolane products, having a wide range of physical and chemical properties, can be made by its simultaneous polymerization in contact with substituted 1,3-dioxolane and the epoxy compounds. Compounds of this nature are in many instances interpolymers although not necessarily so. For the preparation of such compounds, 1,3-dioxolane can be polymerized with the epoxy compounds such as ethylene oxide, 1,2 and 1,3-propylene oxides, tetramethylene oxide, isobutylene oxide and their isomers and metamers. 1,3-dioxolane can likewise be polymerized while in contact with substituted 1,3-dioxolanes such as 4-methyl-1,3-dioxolane, 4,5-dimethyl-1,3-dioxolane, 4,4-dimethyl-1,3-dioxolane, 4-ethyl-1,3-dioxolane, 4-phenyl-1,3-dioxolane; the cyclic acetals, such, for example, as 2-alkyl substituted 1,3-cyclic acetals, e. g. 2-methyl-1,3-dioxolane, 2-ethyl-1,3-dioxolane, 2-n- and 2-iso-propyl-1,3-dioxolane, 2-n- and 2-iso-butyl-1,3-dioxolane and higher 2-alkyl substituted cyclic acetals as well as the cyclic ketals 2,2-dimethyl-1,3-dioxolane, 2,2-diethyl-1,3-dioxolane, 2-methyl-2-ethyl-1,3-dioxolane, etc. The aryl substituted 1,3-dioxolanes such, for example, as 2-naphthyl-1,3-dioxolane, 2-phenyl-1,3-dioxolane; the aralkyl substituted 1,3-dioxolanes such as 2-p-methylphenyl-1,3-dioxolane; 2-hydroxy methyl-1,3-dioxolane,

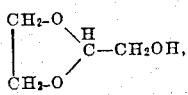

obtained from glycol aldehyde and ethylene glycol, and di-1,3-dioxolane,

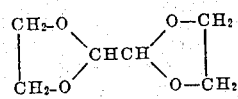

obtained from glyoxal and ethylene glycol may likewise be treated in accord with the invention. Products having a wide range of properties can be obtained by varying the ratio of the monomers.

The partially polymerized or fully polymerized cyclic acetals of the invention may also be mixed with the monomeric or partially or fully polymerized substituted or unsubstituted 1,3-dioxolanes, substituted or unsubstituted 1,3-dithiolanes, or the epoxy compounds mentioned above. By this means interpolymers and mixed polymers having a wide range of characteristics are obtained.

1,3-dioxolane polymers, interpolymers, mixed polymers, and monomer-polymer mixtures may be further modified before or after polymerization by substances which will dissolve in the monomer and/or polymer and thereby render the resulting composition more flexible and resistant to moisture, oil, and the like. There may be selected from the classes normally recognized as plasticizers or from those actually classed as plastics, film formers, etc. While in many instances plasticizing and softening agents are not completely miscible or soluble in the polymers of the invention, nevertheless generally they are sufficiently soluble to give many desirable plasticizing and softening effects.

Polymeric 1,3-dioxolane, either plasticized or not, may be formed as slabs, discs, or sheets, and as such may be used in the manufacture of unsplinterable glass. It is also within the scope of the invention to add filling materials (e. g. china clay, wood flour, asbestos, etc.) and/or colouring matters, soluble and insoluble, to the polymerization product prior to polymerization. Such materials as metallic powders, crushed mica, may be added in a similar way.

Examples will now be given illustrating embodiments of the invention, but it will be understood that it will not be limited by the details thereof. Parts are by weight unless otherwise indicated.

*Polymerization of 1,3-dioxolane*

*Example 1.*—A mixture containing 417 parts of 1,3-dioxolane and 2 parts of sulfuric acid was heated on a water bath under a return condenser for 5 hours. At the end of the first hour the mixture became viscous and boiling ceased. The catalyst was made alkaline to phenolphthalein by treatment of the warm product with anyhdrous ammonia followed by 2.1 parts of sodium hydroxide and 10 parts of water. The unconverted 1,3-dioxolane amounted to 60 parts and was removed under reduced pressure. The residue was dissolved in benzene, filtered to remove precipitated matter and the benzene diluent removed under reduced pressure. There remained 350 parts of a wax-like, colorless solid miscible with water, benzene, and methanol. It had a melting point between 52 and 58° C. and an apparent molecular weight of 826, estimated by the boiling point method (0.5 to 1.0% of the polymer in benzene).

*Example 2.*—A reaction mixture containing 895 parts of carefully purified 1,3-dioxolane and 2 parts of sulfuric acid was heated on a water bath under a return condenser carrying a drying tube, for 8.5 hours. The product was cooled and unconverted dioxolane, 164 parts, removed by distillation at 2 mm. pressure. During this operation the polymer solidified. It was melted and heated on the water bath for 1.75 hours. The distillation was repeated whereupon 68.9 parts of dioxolane was removed. The remaining polymer plus catalyst was heated 7 hours on the water bath. Subsequent to neutralization of the catalyst with anhydrous ammonia until alkaline to phenolphthalein followed by 1.8 parts of sodium hydroxide in 10 parts of water, 594 parts of colorless, wax-like solid polydioxolane was obtained after removal of 68.9 parts of dioxolane under reduced pressure. This solid polymer, molecular weight of 2400 as estimated by the procedure described in Example 1, was only slightly soluble in benzene at ordinary temperature, soluble in hot benzene and soluble in water.

*Example 3.*—A reaction vessel was charged with 88.8 parts of 1,3-dioxolane and 0.25 parts of concentrated sulfuric acid. The charge was heated to a temperature between 89 and 92° C. for 5 hours on total reflux, the reaction being carried out at atmospheric pressure with continuous stirring. The vessel was heated during the reaction by steam coils and the pot temperature prevented from exceeding 100° C. After cooling to between 60 and 70° C., anhydrous ammonia was introduced into the reaction mixture until alkaline to phenolphthalein. Sodium hydroxide equivalent to the sulfuric acid catalyst was then added as a 50% solution in water. Ammonia and unreacted dioxolane were removed at atmospheric pressure by distillation and the distillation continued under gradually reduced pressure to 20 mm. A yield of 61 parts of polydioxolane was obtained.

*Example 4.*—A reaction vessel was charged with 88.2 parts of 1,3-dioxolane and 0.25 parts of concentrated sulfuric acid. The reaction disclosed under Example 3 was repeated and 59 parts of polydioxolane was obtained. This product had a molecular weight of approximately 1200 and a melting point of 57.7° C.

*Example 5.*—A mixture consisting of 231.3 parts of 1,3-dioxolane and 1 part of anhydrous BF₃ was heated on the steam bath intermittently over a period of 4.25 hours. The effect of the BF₃ was destroyed by treatment of the product with anhydrous ammonia. Unconverted dioxolane was removed under reduced pressure while heating the product in a water bath. 190 parts of a colorless, hard, wax-like solid polydioxolane, estimated molecular weight 1580, was obtained which had a zero hydroxyl number as measured by the procedure of Smith & Bryan, J. A. C. S., vol. 57, page 61 (1935). It is believed that the product obtained contains cyclic polymers such as

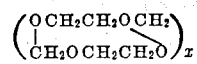

in which $x$ is an integer.

*Example 6.*—To 155.5 parts of 1,3-dioxolane was added 1 part of sulfuric acid. After standing at room temperature for 3 days, a colorless solid polymer was formed.

*Example 7.*—To 132.1 parts of 1,3-dioxolane was added 5. g. of 8/14 mesh silica gel catalyst. The mixture was boiled 14 hours under a return condenser. Removal of the catalyst and unconverted dioxolane gave 25 parts of colorless, viscous liquid polydioxolane which was miscible with water and benzene.

*Example 8.*—Five parts of Filtrol x-143 (an activated clay) was added to 158.7 parts of 1,3-dioxolane and the mixture heated on a water bath for 5.75 hours. Removal of the catalyst by filtration and unconverted dioxolane, 35.3 parts, by heating on a water bath under reduced pressure gave 120 parts of a colorless solid polydioxolane.

*Example 9.*—To 225 parts of carefully purified 1,3-dioxolane was added about 0.05 part of anhydrous BF₃ catalyst and the reaction mixture was set aside at room temperature. At the end of 3 days the 1,3-dioxolane had polymerized to a colorless tough polydioxolane of high molecular weight. A film prepared from this polydioxolane exhiibted the following properties:

Tensile strength_____ 2680 #/sq. in.
Elongation at break____ 50%

Pfund flex (as measured by the Pfund flexing machine) _____ Above 300 with no signs of failure Cold draw_____ Excellent (cold drawn material has a 20–25% elastic stretch)

*Example 10.*—To 100 parts of 1,3-dioxane there was added approximately 0.03% boron trifluoride and the resulting mixture allowed to stand at room temperature for a number of days. At the end of several days time, the 1,3-dioxolane had changed to a gel which could not be poured from the container. At a subsequent date light colored rosettes appeared in the center of the mass and from these rosette-like centers a white solid appeared to grow with the result that within about ten days the whole mass had set to a tough, horny, translucent solid material. At the end of thirteen days the container broke, apparently due to the contraction of the polymeric material.

The polymer was cut into thin shavings, then dissolved in hot water maintained at a temperature in the proximity of 50° C., and dilute ammonia added to neutralize the catalyst. A small amount of sodium hydroxide was subsequently added (approximately 0.1%) and the solution heated at approximately 100° C. at which temperature the polymer precipitated from the solution and after separation and washing was dried in a vacuum oven at 50° C.

The oven-dried product was a tough, flexible sheet of material which was placed between the platens of a press under a pressure of approximately 100 lbs. per sq. in. and at a temperature of 100° C. The sheet (0.015" thick) taken from the press was cut into ½" strips and tested in a tensile testing machine. The film exhibited the following properties:

Tensile strength _____lbs. per sq. in__ 3,900
Elongation at break_____per cent__ 800
Elastic recovery_____do____ 450

Another strip of film was stretched at room temperature to about 650% and a permanent set resulted. This cold-drawn film was tested in a tensile testing machine and recorded a strength of 19,200 lbs. per sq. in.

*Example 11.*—A reaction mixture containing 400 parts of 1,3-dioxolane and about 0.2 parts of boron trifluoride was allowed to stand at room temperature for 5 days. At the end of this time, the polymer, which was a hard, tough, resin-like solid, was converted to thin shavings which were dissolved in 0.1% aqueous NH₄OH at 50–60° C. and precipitated from this solution at 100° C. after adding 3–4 parts of NaOH for every 50 parts of polymer dissolved. The catalyst free polymer was dried at 50° C. in a high vacuum. The properties of this treated polymer, formed into a film as described in Example 10 were:

Appearance _____ Tough, elastic, white.
Tensile strength_____ 3,020 lbs./sq. in.
Elongation at break__ 425%
Elongation recovery__ 325%
Film appearance ____ Colorless, cloudy, flexible. Cold draws well and stretches in the cold drawn state.
Molecular weight____ 86,000 (determined by viscosity of a chloroform solution)
Melting point_____ 63–70° C.

*Example 12.*—A reaction mixture containing 400 parts of 1,3-dioxolane and about 0.2 parts of boron trifluoride was allowed to stand for 13 days at 6° C. In three days the mixture became viscous and in 7 days had solidified. Thin shavings of the resultant solid polymer were dissolved in approximately 0.1% aqueous NH₄OH at 50–60° C. and precipitated from this solution at 100° C. after adding 3–4 parts of sodium hydroxide for every 50 g. of polymer dissolved. The catalyst free polymer was dried at 50° in a high vacuum. The properties of this treated polymer formed into a film as described in Example 10 were:

Appearance_____ Tough, elastic, white
Tensile strength_____ 4,520 lbs./sq. in.
Elongation at break_____ 600%
Elongation recovery to__ 250%
Film appearance_____ Colorless, translucent, non-tacky, flexible, tough. Cold draws well and has considerable stretch in cold drawn state.
Molecular weight determined by viscosity method in chloroform). 196,000

*Cold drawn film*

Tensile strength _____lbs./sq. in__ 5,530
Elongation at break_____Percent__ 200
Elongation recovery to_____do____ 50

*Example 13.*—A reaction mixture consisting of 100 parts of anhydrous cyclohexane, 400 parts of 1,3-dioxolane and about 0.2 parts of boron trifluoride was allowed to stand at room temperature for 11 days, the cyclohexane was evaporated, and a solid polymer obtained. Thin shavings of the polymer were dissolved in about 0.1% aqueous ammonium hydroxide and precipitated from this solution at 100° C. after adding 3–4 parts of sodium hydroxide for every 50 parts of polymer dissolved. This treated polymer was dried at 50° in high vacuum. The properties of the polymer formed into a film as described in Example 10, were:

Appearance_____ Tough, elastic, white
Tensile strength_____ 2,440 lbs./sq. in.
Elongation at break_____ 40%
Elongation recovery to__ 5%
Film appearance _____ Colorless, cloudy. Cold draws well and stretches in the cold drawn state.

*Example 14.*—A reaction mixture comprising 1000 parts of 1,3-dioxolane and 1 part of sulfuric acid was boiled 15 minutes. 47 parts of a colorless viscous polydioxolane, isolated as described in Example 1, was obtained. Its molecular weight was 477.

*Example 15.*—A reaction mixture consisting of 156.3 parts of 1,3-dioxolane and 2.5 parts of p-toluene sulfonic acid was set aside at room temperature. At the end of six days the dioxolane had polymerized to a colorless, viscous liquid.

*Example 16—Ethylene oxide+1,3-dioxolane polymerization.*—A reaction mixture was prepared containing 95 parts of 1,3-dioxolane, 95 parts of liquid ethylene oxide, and 1 part of anhydrous BF₃, cooled in a dry ice-methanol bath. The mixture, so prepared, was warmed gently under a dry-ice cooled condenser and finally heated for 4 hours on a steam bath. A viscous colorless liquid product was obtained. Subsequent to neutralization of the catalyst with excess anhydrous ammonia, unconverted reactants were removed under reduced pressure at 1 mm. and 100° C. The interpolymer, 122 parts, was a light brown, viscous liquid soluble in water, methanol and benzene.

*Example 17—Interpolymerization of propylene oxide and 1,3-dioxolane.*—A reaction mixture consisting of 140 parts of propylene oxide, 100 parts of 1,3-dioxolane and ca. 1 part of BF₃ catalyst was heated under a return condenser for 23.5 hours. The catalyst was destroyed by treatment with anhydrous ammonia. Removal of unconverted reactants under reduced pressure gave 59 parts of a viscous light yellow liquid polymer which was soluble in methanol and benzene but practically insoluble in water.

*Example 18—1,3 - dioxolane+2-phenyl-1,3-dioxolane polymerization.*—A reaction mixture, prepared by addition of 3 parts of anhydrous BF₃ to 60 parts of 1,3-dioxolane and 60 parts of 2-phenyl-1,3-dioxolane, was heated on a steam bath for 2.75 hours. To the cooled product was added 5.3 parts of sodium hydroxide in 15 parts of water. At 2 mm. and a bath temperature of 150° C., water, 8 parts of unconverted 1,3-dioxolane, and 1 part of unconverted 2-phenyl-1,3-dioxolane were removed. Salts were removed by filtration. 94 parts of an amber-colored somewhat viscous liquid polymer, estimated molecular weight 346, was obtained which was insoluble in water and soluble in benzene and methanol.

*Example 19—1,3-dioxolane-cyclohexanone ethylene glycol cyclic ketal polymerization*

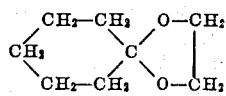

A mixture comprising 71 parts of cyclohexanone ethylene glycol cyclic ketal, 740 parts of 1,3-dioxolane and 4 parts of sulfuric acid was heated on the water bath for 5 hours. Boiling ceased after heating 1 hour with the production of a viscous liquid. The cooled reaction mixture was treated with anhydrous ammonia followed by 3.4 parts of sodium hydroxide dissolved in 12 parts of water to destroy the catalyst. Under reduced pressure 217 parts of unconverted 1,3-dioxolane and 32 parts of unconverted cyclohexanone ethylene glycol cyclic ketal were removed. A benzene solution was filtered to remove salts. Removal of benzene under reduced pressure to 1 mm. and a bath temperature of 100° C. gave 561 parts of a light red, viscous liquid polymer, molecular weight 1130, which was miscible with water.

*Solution polymerization*

*Example 20—Polymerization of 1,3-dioxolane in 1,4-dioxane solvent.*—A reaction mixture prepared by mixing 100 parts of 1,3-dioxolane, 400 parts of dried, 1,4-dioxane and 2 parts of H₂SO₄ was heated 7 hours on a steam bath. At all times the reaction mixture was homogeneous. The catalyst was destroyed with 2 parts of sodium hydroxide dissolved in 5 parts of water. Removal of solvent and unpolymerized dioxolane gave 5 parts of a viscous liquid polymer which had a molecular weight of 248.

*Polymerization in solvent for monomer—Nonsolvent for polymer*

*Example 21—Polymerization of 1,3-dioxolane in cyclohexane solvent.*—A homogeneous reaction mixture prepared by dissolution of 100 parts of 1,3-dioxolane in 400 parts of cyclohexane containing 2 parts of sulfuric acid was heated on a water bath under a reflux condenser for 7 hours. At the end of the first hour, liquid polydioxolane began separating. On working up the product as described in Example 16, 26 parts of a viscous liquid polydioxolane was obtained.

The higher molecular weight polymers obtained in accord with the process of the invention have the unusual property of being cold drawable, and moreover, products which are cold drawn have an increased tensile strength and resistance to wear. The cold drawing may be effected by various means, for example, the molten polymer may be spread on a flat surface, such as glass, and after cooling the resulting film may be subjected to tension under which the film will stretch from 200 to 600%, to a permanent set. Other known methods of cold drawing may be employed. The cold drawing operation in addition to increasing the tensile strength of the film likewise orients the fibers and renders the film suitable for such applications in which filaments having oriented molecules are adaptable, for example, in preparation of Poloroid films and the like.

For the actual manufacture of fibers from the higher molecular weight polymers of the invention these may be spun directly from the molten polymer, or a solution made by dissolving the polymer in a solvent and the resulting mixture spun through a fine nozzle or spinneret. Thus a solution of the high molecular weight polymer is prepared either alone or together with another fiber forming material, such as the cellulose derivatives, e. g. cellulose nitrate, cellulose acetate, cellulose acetopropionate, and the like, in a mutual solvent, such as acetone or chloroform. The solution may be extruded through a fine spinneret into a chamber maintained at an elevated temperature to accelerate the evaporation of the solvent and the formation of the filament. Such a solution may, if desired, be spun into a chamber containing a liquid instead of air, the former being capable of dissolving the solvent from the polymer.

In a similar manner the polymers of the invention can be spun directly from the molten state, the spinneret being maintained at suitably elevated temperature and in this instance no solvent removal is required for the filament is formed directly upon cooling. In order to obtain the high tensile strength and wear resistance, the spun filaments or fibers should be submitted to the action of mechanical stress or stretching to produce the high orientation which gives greater strength, pliability and elasticity.

In the specification and claims attached, it will be understood that polymers and interpolymers of 1,3-dioxolane and/or its derivatives refer to the product resulting from the polymerization of the monomeric compound. The exact molecular structure of the polymer resulting from the polymerization of 1,3-dioxolane is not known; in this application and the appended claims, however, the term "polymeric 1,3-dioxolane" will be used to indicate the polymer although it is understood that the polymer may or may not contain the cyclic form of 1,3-dioxolane.

The compounds prepared in accord with the invention may be employed for a large number of uses. The polymers which are soluble in water are suitable as additions to various baths for the treatment of natural and synthetic textiles. For example, they may be employed in washing, dyeing, after-treating, mercerizing, carbonizing, fulling, wetting, dispersing, emulsifying, and levelling operations, and furthermore, for improving the fastness of dyeings to rubbing. These polymers may likewise be used as solvents and as assistants for converting dyestuffs into pastes and as emulsifying agents, for instance, for dispersing oils, fats, and hydrocarbons.

The products dissolved or dispersed in water likewise have desirable properties so that they may be employed in such form in the textile, leather, paper, wax, and polish industries, as for example, in coating, mercerizing, dressing, bucking, finishing, printing or polishing, in the formation of carbon paper and belt dressings. In such uses the solid polymers may also be employed as wax substitutes for carnauba, Montan wax, and the like. They are likewise suitable for use in dyeing and printing because of their spreading, levelling, binding action; for example, with vat dyestuffs, or with azo dyestuffs from β-naphthoic acid arylides on the fibre, the dyeings are rendered by their use more uniform and fast to rubbing. For similar purposes they may be used with pigments and paints as well as being useful as a protective film and dispersing agent for ceramic colors and as a bodying agent and solvent in printing oils.

Products which are sufficiently soluble in lipoids may be employed in preparations for oiling, sizing or finishing and as softening agents for textiles and also in the production of salves, cosmetic and pharmaceutical preparations, greasing agents, stuffing agents, fat thickening agents, cutting or boring oils, polishing masses, agents for protecting the surface of metals from corrosion as well as additions to lacquers, varnishes, and paints.

The polymers may be used as preservatives and plasticizers for synthetic and natural rubber, caoutchouc and the like which may or may not be vulcanized and may also be employed as an anti-squeak fluid with or without graphite.

The liquid to solid polymers can be used as such or in mixture with materials having known cleaning, wetting and dispersing powers which otherwise serve to bring the polymerization products into a form specifically desired for use. As such addition agents may be mentioned by way of example, soaps, Turkey red oils, mineral oils and fatty alcohol sulphonates, alkylated naphthalenesulphonic acids, glue, gelatine, casein, sulphite cellulose waste liquor, water-soluble gums, mucilages, alcohols, ketones, hydrocarbons, halogenated hydrocarbons or mixtures of these substances. The liquid or solid polymers may be used in dressing and sizing of natural yarns such as cotton, wool, silk, etc., and the synthetic yarns such as cellulose acetate, polyamide, casein, regenerated cellulose, etc. These polymers may likewise be found to be applicable for use in shrink-proofing of wool to improve the appearance and feel of the product.

The polymers and more particularly the high molecular weight polymers are suitable as plasticizers, elasticizers and softening agents for the addition to regenerated cellulose, the cellulose esters, such as cellulose formate, cellulose acetate, cellulose nitrate, cellulose acetonitrate, cellulose acetopropionate, cellulose butyroacetate and similar mixed esters of cellulose including the water sensitive cellulose derivatives, prior or subsequent to film and filament formation. The polymers are likewise applicable in substantially the same capacity for addition to the relatively water-insoluble cellulose ethers, such as ethyl cellulose and methyl cellulose. They likewise may be added to the synthetic resins, such, for example, as the esters of acrylic and methacrylic acid and their derivatives and more especially the monomers and polymers of methyl methacrylate, methacrylonitrile, acrylonitrile, methyl acrylate and the other monomeric and polymeric esters and derivatives of acrylic and α-substituted acrylic acids; and to the monomeric and polymeric vinyl resins such as vinyl acetate, vinyl chloride, vinyl chloracetate, styrene polyvinyl alcohol, the polymerized olefines, polymeric ethylene oxides, and polymeric compounds generally.

The liquid to solid water-soluble polymers may likewise be used as water-soluble lubricants for rubber molds, on textile fibers, and in metal forming operations, and as a lubricant and coolant in cutting, drilling, and machining operations.

The polymers generally may be used advantageously as plasticizers or softeners for use in materials such as casein, glue, gelatine, cork, printing inks, water-soluble art crayons, shoe dressings (white or colored), water paints, paper coatings, kalsomine, plaster and sizing materials, and hair dressings for permanent waves.

The polymers may likewise be found to be useful as addition agents for preparing oil well drilling muds, for modifying natural and synthetic waxes; dispersing agents and ingredients for fungicides, insecticides, sprays, etc.; as a fumigant, as a scrubbing liquid in air purification; and as a heat transfer medium; as an assistant in textile spinning baths, for twist setting of yarns, for crease and crinkle proofing fabrics; for making oil resistant fabrics, and for delustering synthetic yarns; for creaseproofing of paper, humectant for addition to tobacco; as an extractant for tobacco, coffee, oil, to extract albumin from dried milk and as a vitamin extractant; for treating fruits, foods, etc., by vacuum pressure injection to hasten ripening process; as a frost inhibitor in drying oils; as a plasticizer for polyvinyl acetals; ice formation inhibitor in gas mains, refrigeration systems, and oil lines; embalming fluid; as an aid in grinding cement clinker, and as a binder for abrasives. The high molecular weight polymers in the form of a film may be used as a substitute for transparent and opaque films for wrapping comestibles and for other extended film uses. Films of the polymers may be coated, if desired, with suitable compositions to render them water insoluble.

I claim:

1. The process which comprises simultaneously polymerizing 1,3-dioxolane with ethylene oxide, in the presence of an acidic polymerization catalyst selected from the group consisting of sulfuric acid, phosphoric acid, hydrochloric acid, hydrofluoric acid, boron fluoride, paratoluene sulfonic acid, and camphor sulfonic acid, neutralizing the catalyst and subsequently recovering the resulting polymeric product.

2. A 1,3-dioxolane-alkylene oxide interpolymer, the alkylene group containing less than 5 carbon atoms.

3. A 1,3-dioxolane-ethylene oxide interpolymer.

4. The process which comprises heating under substantially anhydrous conditions 1,3-dioxolane with an alkylene oxide containing less than 5 carbon atoms in contact with a catalyst selected from the group consisting of sulfuric acid, phosphoric acid, hydrochloric acid, hydrofluoric acid, boron fluoride, paratoluene sulfonic acid and camphor sulfonic acid, neutralizing the catalyst and subsequently recovering the resulting polymeric product.

WILLIAM F. GRESHAM.